Feb. 28, 1950

G. HERZOG 2,499,312

VOLTAGE SUPPLY SYSTEM

Filed March 31, 1947

INVENTOR.
GERHARD HERZOG

BY Daniel Stryker

ATTORNEY

Patented Feb. 28, 1950

2,499,312

UNITED STATES PATENT OFFICE 2,499,312

VOLTAGE SUPPLY SYSTEM

Gerhard Herzog, Houston, Tex., assignor to Texaco Development Corporation, New York, N. Y., a corporation of Delaware Application March 31, 1947, Serial No. 738,476

5 Claims. (Cl. 321—16)

This invention relates to voltage supplying systems and has for its principal object to provide such a system capable of delivering a high and well regulated voltage.

In many instances it is desirable to have a high voltage power supply system, the power for which is derived from an A. C., the output voltage of which will be a well regulated D. C. voltage free from any surges of voltage above the established value. A typical example of equipment which should be operated with such a well regulated high voltage supply system is gamma ray equipment, which is frequently operated with D. C. supply voltages in the order of 1800 volts, for example. It is known that any surges of voltage are harmful to the operation of gamma ray counters.

The D. C. voltage is commonly obtained from an ordinary alternating voltage power supply, such as a rectified 60 cycle voltage. Such a voltage supply system is subject to the disadvantage that variations in the alternating supply voltage produce corresponding and exaggerated variations of the D. C. voltage. Accordingly, it has been a common practice to incorporate into the system a voltage regulator which has the effect of maintaining the output D. C. voltage substantially constant in spite of the variations in the alternating power supply.

It has been found, however, that the voltage regulator introduces its own defect into the system, this being in the form of an undesirably large surge of output D. C. voltage shortly after the power is turned on. The reason for this surge or over shooting of the output voltage lies in the inherent action of the vacuum tube used to control the regulator. Such regulator tubes are ordinarily of the gaseous discharge type; and it is inherent in their operation that the voltage necessary to initiate the discharge in such a tube is higher than the steady voltage required to maintain the tube in operation after it is started; and since the voltage across the regulator tube is a governing factor in determining the D. C. output voltage of the supply system, the voltage surge is a consequence.

In accordance with my invention I overcome the foregoing defect in the operation of the regulator by operating the regulator tube in reverse from its normal direction of operation during the period of time when the undesired voltage surge would otherwise occur. I accomplish this by connecting the regulator tube in relation to the A. C. supply voltage and its own power supply so that it is reversed in polarity for a short time after the power is turned on, after which it resumes its normal polarity. This can be done by connecting the anode of the regulator tube directly to a low voltage side of the A. C. power supply as well as to its own D. C. supply.

I have found that by this novel and unusual expedient of a reversal of the regulator tube, the undesired over-shooting is avoided.

The foregoing and other features of my invention will be better understood from the following detailed description and the accompanying drawing in which.

Figure 1:
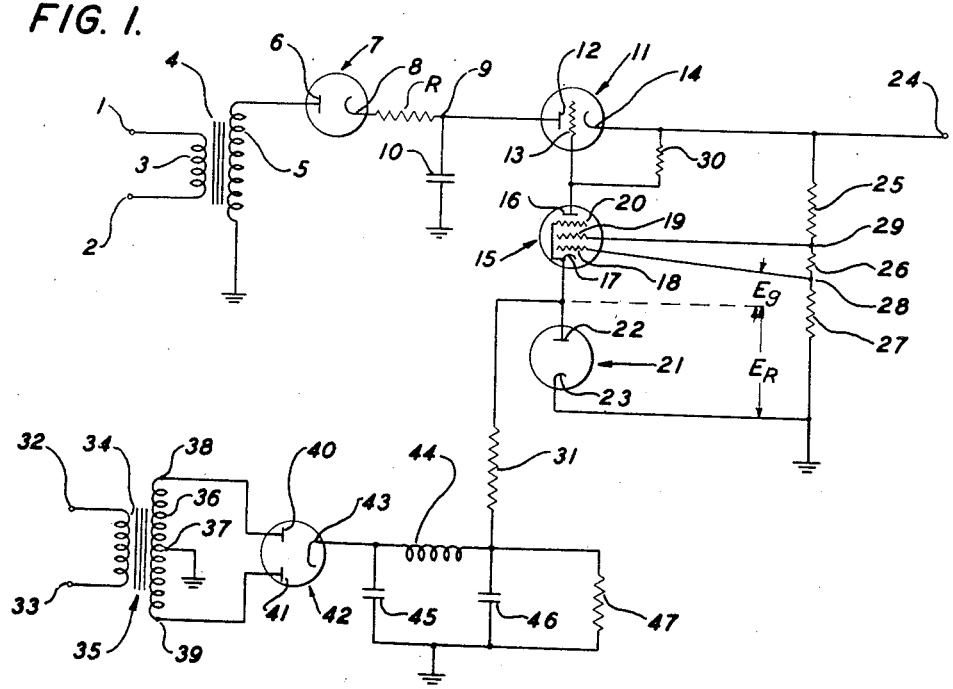
Fig. 1 shows a voltage supply system according to the prior art.

Referring to Fig. 1 there is shown a voltage supply system of a prior known type, adapted to deliver a D. C. voltage from an alternating current power supply. This prior system is being illustrated and described herein to aid in an understanding of the improvement introduced by my present invention.

In Fig. 1 the system is operated from a source of alternating current power supply such as an ordinary 60 cycle system impressed on the input terminals 1 and 2. This voltage is impressed on the terminals 1 and 2 of the power transformer 4 having a secondary winding 5, one end of which is connected to the ground. The high voltage side of secondary winding 5 is connected to the anode 6 of a rectifier 7, the cathode 8 of which carries its output. There accordingly appears at terminal 9 of the rectifier tube a D. C. voltage, the A. C. ripple of which is substantially reduced or limited by a filter comprising the resistor R and the condenser 10.

The output of the rectifier 7 is fed into a voltage regulator system to maintain the D. C. output voltage substantially constant in spite of variations of the A. C. input voltage. This regulator system comprises a triode tube 11 having an anode 12, a grid 13 and a cathode 14. The rectifier cathode is connected to anode 12, and the cathode 14 is connected with the D. C. output terminal 24 of the system. The regulator system also comprises a control pentode tube 15 having an anode 16, a cathode 17, a control grid 18, a screen grid 19, and a suppressor grid 20; and also a voltage regulator tube 21 which is a diode having an anode 22 and a cathode 23.

There is connected between the output terminal 24 and ground a voltage divider comprising resistors 25, 26 and 27 in series, which carry D. C. current from tubes 7 and 11. The control grid 18 of pentode 15 receives its operating voltage from junction point 28 of the voltage divider; and the screen 19 receives its operating voltage from junction 29 of the voltage divider; the suppressor grid 20 being tied to the cathode 19 as shown. The anode 16 of tube 15 is connected directly to the grid 13 of triode 11 and receives its operating voltage through a resistor 30 connected from the high voltage side of the voltage divider to the anode 16.

The voltage regulation in this system is due essentially to the diode regulator tube 21, the operating voltage for which is supplied from a separate power supply system through a resistor 31. This latter power supply may receive its power from a conventional alternating current power source such as a 60 cycle supply line impressed across terminals 32 and 33 of the primary winding 34 of a transformer 35. The secondary winding 36 of the transformer has a mid-tap 37 which is connected to ground, and the respective terminals 38 and 39 are connected to respective anodes 40 and 41 of a full wave rectifier tube 42 having a cathode 43. According to the usual practice there is provided a filter system at the output of the rectifier 42, comprising a choke coil 44 in series with the rectifier and condensers 45 and 46 connected respectively on either side of the choke to ground. The D. C. output voltage of this power supply appears across resistor 47, the ungrounded side of which carries the high D. C. voltage of the power supply which is impressed through resistor 31 on anode 22 of diode 21.

A voltage supply system of the type shown in Fig. 1 is a means for supplying relatively high D. C. voltages, for example, of the order of 1800 volts at the output terminal 24. It has been found in the operation of the system of Fig. 1 that shortly after the power is turned on, an undesirably high voltage surge occurs at the output terminal 24 before the output voltage settles down to its normal regulated value. Such a surge can be harmful to the operation of some types of apparatus and it is very desirable to eliminate the surge.

Figure 2:
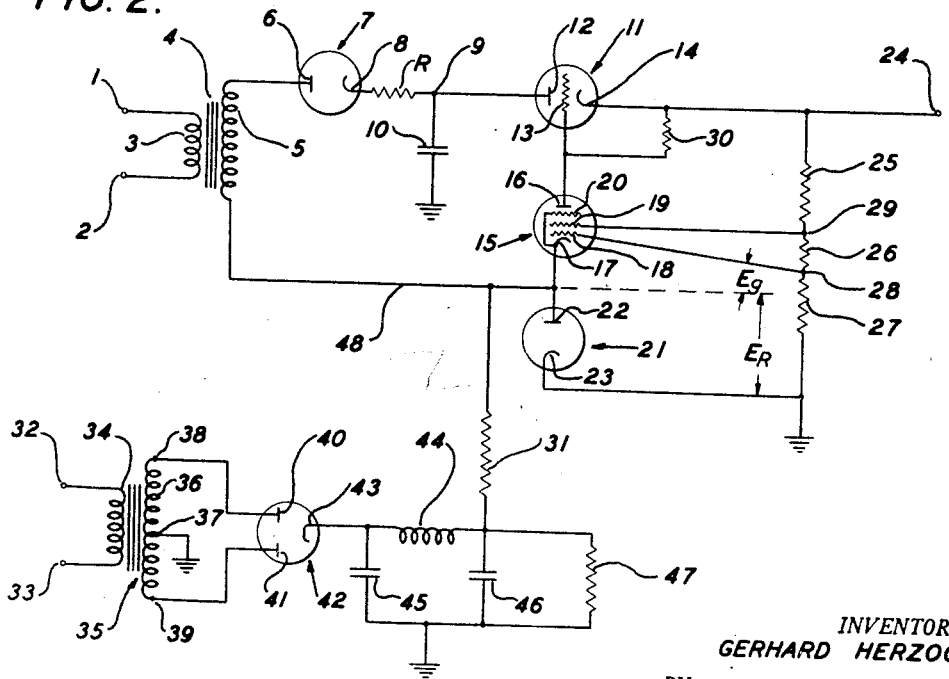
Fig. 2 shows a voltage supply system embodying my invention.

I have found in accordance with my present invention that I can eliminate the undesirable voltage surge by reconstructing the system of Fig. 1 to reverse the polarity of the voltage regulator tube until danger of the over-shooting is past. Such a reconstruction is shown in Fig. 2. In Fig. 2, the numbered parts designate the same numbered parts shown in Fig. 1. The difference between Fig. 1 and Fig. 2 resides in the fact that the ground has been removed from the lower end of secondary winding 5 at power transformer 4; and in connecting this lower end of winding 5 directly to the cathode 17 and anode 22, over lead 48.

Although the reason why the change shown in Fig. 2 eliminates the over-shooting, may not be readily apparent, it is doubtless due to the fact that the regulator tube 21 is being operated opposite to its usual operation. This can best be explained by reference to Figs. 3, 4, 5 and 6. The system of Fig. 1 operates as follows: The pentode tube 15 draws anode current through resistor 30 in an amount which depends on the biasing voltage on control grid 18; and this biasing voltage is equal to the difference between the voltage at point 28 of the voltage divider relative to ground, and the voltage across the regulator tube 21. In general, the voltage at point 28 is maintained slightly negative relative to the voltage at anode 22 of the voltage regulator tube, so that the grid bias on grid 18 is ordinarily slightly negative.

The manner in which the system regulates the output voltage at output terminal 24 can be observed from the following example. Suppose that the output voltage at terminal 24 were to increase relative to ground, then the voltage at point 28 would likewise increase somewhat, owing to the increased current through the voltage divider, which would make point 28 somewhat less negative with respect to cathode 17. This would allow more current to flow through tube 15, and consequently through resistor 30 which is in series with tube 15. This would increase the D. C. voltage across resistor 30, which would have the effect of making the grid 13 of tube 11 less positive, thereby decreasing the current which is allowed to flow through it and through the voltage divider, and consequently reducing the D. C. output voltage at terminal 24. If the voltage at terminal 24 should tend to drop on account of some momentary drop of the power supply voltage the converse of the action would occur, which would tend to maintain the output voltage at its normal predetermined value, regardless of the changes in the power supply voltage.

As the output voltage is determined by the bias on the grid 18 of tube 15, which in turn is dependent upon the voltage across regulator tube 21, it will be seen that the effective operation of the voltage regulator system is dependent upon the maintenance of a constant voltage across the regulator tube 21.

Figure 3:
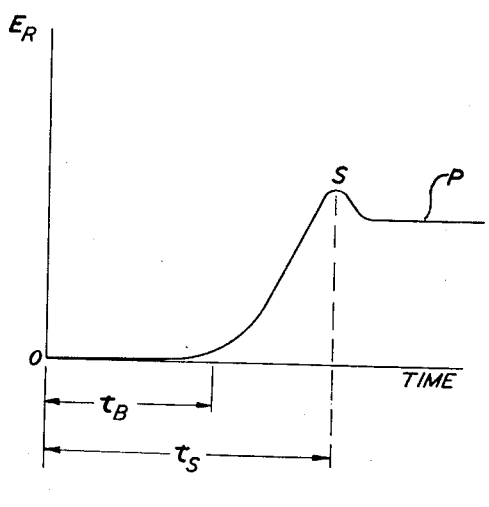
Fig. 3 shows a graph of voltage versus time at the output of the system of Fig. 1.

It has been found that the output voltage at terminal 24 in Fig. 1 overshoots its desired predetermined voltage value shortly after the system is turned on and this overshooting is due to the action of the regulator tube 21. A regulator tube such as 21 is ordinarily a gas filled tube. It is a characteristic of such gas filled tubes that the voltage necessary to initiate its discharge and send a current through it is greater than the steady operating voltage required to maintain it in operation. This is illustrated in Fig. 3 which is a graph of the voltage $E_R$ across the regulator tube against time, zero time being the moment at which the alternating current power is turned on at terminals 1 and 2 and at terminals 32 and 33. The time $t_B$ in Fig. 3 is the time required for the cathode 43 of the power supply rectifier tube 40 to heat up and thereby develop output voltage across resistor 47. After the time $t_B$ the voltage across resistor 47 rises rapidly as the cathode 43 heats up and allows current to flow; and this voltage across resistor 47 is applied through resistor 31 to the anode 22 of regulator tube 21. Accordingly, the voltage $E_R$ across the regulator tube rises rapidly as shown in Fig. 3; and it keeps rising up to the peak S of the curve at time $t_S$, this being the "starting" of the regulator tube. This starts the discharge of the regulator tube, whereupon the voltage returns to the normal operating voltage P which is represented by the uniformly flat side of the curve subsequent to the peak S.

Figure 4:
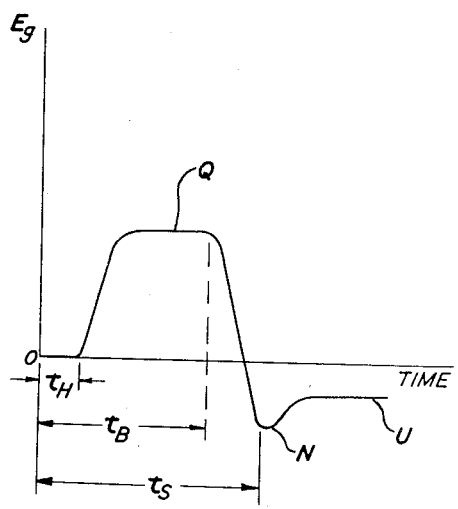
Fig. 4 shows a graph of voltage versus time at the regulator tube in the system of Fig. 1.

This behavior of the regulator tube is reflected to the grid bias on grid 18 of the pentode 15; and Fig. 4 shows graphically the change of the grid bias $E_g$ on grid 18. Usually the high voltage system supplied at terminals 1 and 2 of transformer 4 builds up faster than the power supply system supplied at terminals 32 and 33; and accordingly, current will start to flow through the voltage dividers 25, 26, 27 before current flows through resistor 47. This will cause the grid bias $E_g$ at point 28 to start to build up in a positive direction after a time $t_H$ which is shorter than time $t_B$. This grid bias $E_g$ will reach a maximum value Q a short time after $t_H$ and will stay at the value Q until time $t_B$ at which the voltage $E_R$ starts to build up. As the voltage $E_R$ is also positive relative to ground, its effect is to reduce the voltage difference between the cathode 17 and the grid 18, and accordingly, grid 18 becomes less positive relative to cathode 17 as voltage $E_R$ rises. During this build up of the voltage $E_R$, the voltage $E_R$ finally exceeds the voltage of point 28, thereby making the cathode 17 positive relative to the grid 18 so that the grid voltage $E_g$ drops to a negative value, reaching a negative peak N coinciding with the time of the peak S of voltage $E_R$. Then, as the voltage $E_R$ drops to its regular operating value P the negative voltage $E_g$ reduces to the somewhat less negative value U at which it remains constant and determines the regular output voltage at terminal 24.

This output voltage at terminal 24 is thus determined by reason of the fact that it depends on the current flowing through the tube 11 and on to the voltage divider; and the current flowing through tube 11 is dependent on the bias of its grid 13 which is in turn dependent on the current flowing through resistor 30. As the current flowing through resistor 30 is dependent on the voltage $E_g$ as shown in Fig. 4 it would be apparent that the more negative $E_g$ is the less current will flow through resistor 30 and the less negative will be the bias in grid 13 and the greater the output voltage. Accordingly, it is apparent that there will be a surge or peak of output voltage at terminal 24 corresponding to the peak N after which the output voltage will reduce to the normal constant value determined by the voltage U in Fig. 4.

Figure 5:
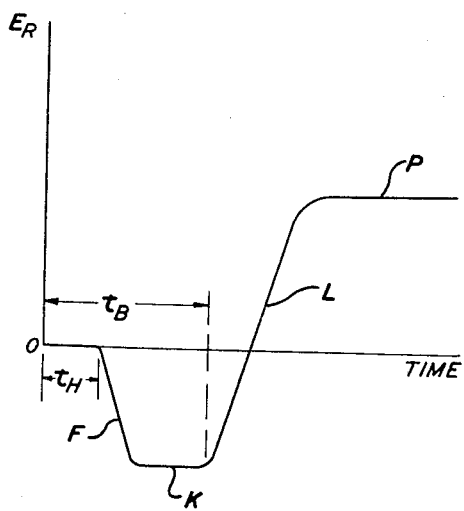
Fig. 5 shows a graph of output voltage versus time of my improved system of Fig. 2.
Figure 6:
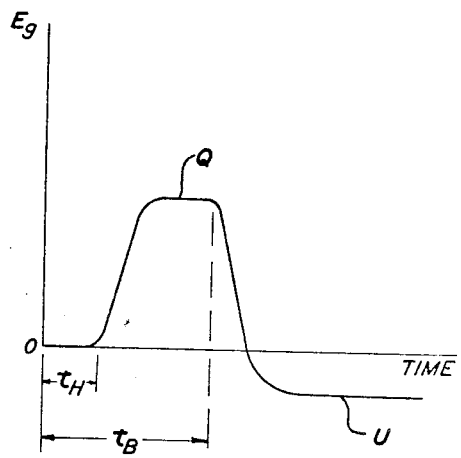
Fig. 6 shows a graph of voltage versus time at the regulator tube in the system of Fig. 2.

It will thus be seen that the undesired peak of the output voltage at terminal 24 can be avoided if the negative peak N can be eliminated from Fig. 4, that is, if the voltage $E_g$ can be changed to conform with that shown in Fig. 6. This, I have accomplished by the modification of the system as shown in Fig. 2. This modification in the circuit produces the change of the voltages $E_R$ and $E_g$ as shown in Figs. 5 and 6 respectively. It will be seen that Figs. 5 and 6 are similar to Figs. 3 and 4 respectively except for the elimination of the peaks S and N. This elimination of the undesired peaks is due to the following factors.

The high voltage circuit will begin supplying voltage and current through the voltage divider at time $t_H$ the same as in the operation of Fig. 1; and likewise, the power supply from transformer 35 will not start to deliver D. C. voltage to the regulator tube until time $t_B$. During this time, the current from secondary winding 5 is flowing through rectifier 7, tube 11, voltage divider 25, 26, 27, ground resistors 47 and 31, lead 48 back to the low end of winding 5. This flow of current will manifestly place the anode 22 of the regulator tube 21 negative with respect to ground. This is represented in Fig. 5 by the portion F of the curve wherein $E_R$ drops to a negative value K and remains constant at value K until time $t_B$. At time $t_B$ the power supply circuit including rectifier 42 starts to send current through resistor 47 in the direction opposite that in which it was flowing through resistor 47 prior to time $t_B$; and this will cause the voltage $E_R$ to become less negative and more positive along portion L. Finally, the voltage $E_R$ reaches its uniform value P, but passes from portion L to P without going through the surge or hump S which appears in Fig. 3.

The reason why the surge S does not appear in the operation according to Fig. 5 may not be entirely clear, but my work has shown nevertheless, that when the regulator tube is operated in the conventional manner to render its anode negative, prior to sending it positive, the high starting voltage is not required in order to flash the tube. I believe that the explanation for this smooth transition to value P lies in the fact that during the time interval from $t_H$ to $t_B$, the regulator tube is operated in reverse from the conventional practice; and during this time interval, sufficient ionization is produced in the gas of the tube so that when the current direction in the tube is reversed to render the anode positive, the discharge takes place smoothly. It is generally understood that the reason for the ordinary voltage difference between the starting voltage and operating voltage of a voltage regulator gas discharge tube is caused by the necessity of initiating the ionization of the gas. In accordance with my novel circuit as shown in Fig. 2, this initial ionization is done during a time where voltage $E_g$ is positive and the voltage at terminal 24 is still at a low value. Then when the output voltage rises to its normal value the tube 21 is already ionized so that it goes into its normal value P and produces a smooth transition at Q as shown in Fig. 6 so that the undesired voltage surge encountered in the system of Fig. 1 is avoided.

I claim:

1. In a voltage supply system comprising in a series circuit, a source of power voltage, a rectifier, a current control tube having a control grid, and an output voltage divider resistor across which a D. C. output voltage is developed, and means for regulating said output voltage including, in series, a resistor across which a biasing voltage is developed for biasing the grid of said current control tube and a second control tube for controlling the current through said biasing resistor the anode of said second control tube being connected to the resistor, the combination which comprises a gaseous discharge regulator tube which with said series connected resistor and the second control tube is connected across said voltage divider, a power supply system connected across said regulator tube with the positive terminal connected to the anode of said tube for supplying D. C. voltage to the anode of the regulator tube, and a direct ungrounded connection from the anode of said regulator tube to the low voltage side of the first mentioned source of power voltage.

2. In a voltage supply system comprising in a series circuit, a source of power voltage, a rectifier, a current control tube having a control grid, an output voltage divider resistor across which a D. C. output voltage is developed, and means for regulating said output voltage including in series, a resistor across which a biasing voltage is developed for biasing the grid of said current control tube, and a second control tube in series with said biasing resistor for controlling the current through it, the combination which comprises a gaseous discharge regulator tube which with said series connected resistor and the second control tube is connected across said voltage divider, said second control tube having a control grid connected to a point of the voltage divider and having its anode connected to said biasing resistor and its cathode connected to the anode of said gaseous discharge regulator tube, a separate power supply system connected across said gaseous discharge regulator tube for supplying D. C. voltage to the anode of said tube with the positive terminal of the separate power supply connected to the anode of said tube, and a direct ungrounded connection from the anode of said regulator tube to the low voltage side of the first mentioned source of power voltage.

3. Apparatus according to claim 2 in which the first mentioned source of power voltage sends current through said rectifier and current control tube and voltage divider before said second mentioned power supply system supplies D. C. voltage to the anode of the gaseous discharge tube, after the power is applied simultaneously at both said source of power and at said power supply system.

4. In a voltage supply system comprising in a series circuit, a source of alternating power voltage, a rectifier, a current control tube having a control grid, an output voltage divider resistor across which a D. C. output voltage is developed, a regulating system for regulating said D. C. output voltage including in series, a resistor, a control tube across which a biasing voltage is developed and a second control tube having its anode in series with said biasing resistor and having a control grid and a cathode, the combination which comprises a gaseous discharge regulator tube having an anode and a cathode, the last mentioned anode being connected in series with the cathode of the second control tube and the last mentioned cathode being connected with a point on said voltage divider, the control grid of said second control tube receiving its voltage from a point of said voltage divider which is at a more positive potential than the cathode of said gaseous discharge regulator tube, a separate power supply system connected across said regulator tube with its positive terminal connected to the anode of the tube for supplying D. C. voltage to the anode of said gaeous discharge regulator tube and a direct ungrounded connection from the anode of said regulator tube to the low voltage side of the first mentioned source of power voltage.

5. A supply system according to claim 4 in which D. C. current flows through the voltage divider before D. C. current flows in the separate power supply, whereby the voltage on the cathode of said regulator tube is more positive than on its anode for a period of time after the power is turned on, and then after said separate power supply delivers voltage, the voltage on the anode of said gaseous regulator becomes higher than on its cathode, whereby undesired voltage surges at the output of said system are avoided.

GERHARD HERZOG.

REFERENCES CITED

The following references are of record in the file of this patent:

UNITED STATES PATENTS

| Number | Name | Date |
|---|---|---|
| 1,642,091 | Slepian | Sept. 13, 1927 |
| 1,819,604 | Jaumann | Aug. 18, 1931 |